2,938,907
PRODUCTION OF N-t-ALKYLTHIOPICOLINAMIDES AND N-t-ALKYLTHIOISONICOTINAMIDES

James L. Rainey, Abington, Pa., and Richard C. Mansfield, Haddonfield, N.J., assignors to Rohm & Haas Company, Philadelphia, Pa., a corporation of Delaware No Drawing. Filed Mar. 3, 1958, Ser. No. 718,492

12 Claims. (Cl. 260—294.8)

This invention relates to a process for the production of sulfur-containing organic compounds and to the products thereof.

Broadly stated, the object of this invention is to produce new sulfur-containing organic compounds which are useful as pesticides, metal complexing agents, oil additives, pharmaceuticals, and extractants for use in hydrometallurgical applications.

In accordance with the present invention, new and highly useful compounds are produced by a process which comprises reacting a methylpyridine with sulfur and a t-alkylamine, also known as a t-carbinamine. By this process, there are produced various N-t-alkylthiopicolinamides and N-t-alkylthioisonicotinamides. The general reactions may be indicated as follows:

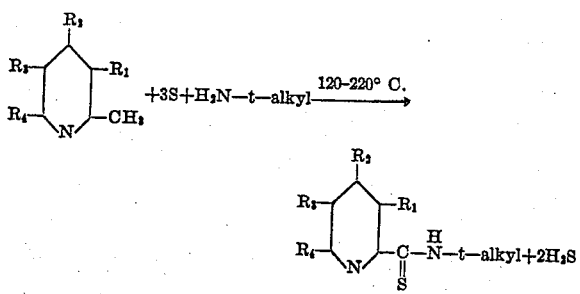

wherein:

$R_1$, $R_2$, and $R_4$=H or $CH_3$
$R_3$=H or $C_2H_5$ t-alkyl=a group having at least four carbon atoms and includes the following structural relationship with the —NH— group:

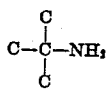

or

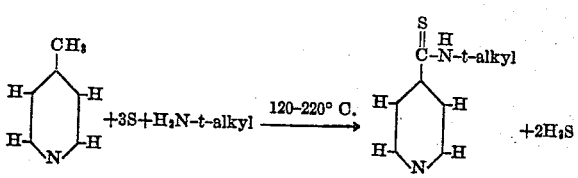

Depending upon the product desired, there can be employed any one of a number of starting materials. For example, the methylpyridine can be chosen from a variety such as alpha-picoline, gamma-picoline, 2,3-lutidine, 2,4-lutidine, 2,6-lutidine, and 2-methyl-5-ethylpyridine. The t-carbinamine can be selected from a large variety of t-alkyl primary amines. Among the commercially available t-alkylamines, there may be mentioned t-butylamine, t-octylamine, t-nonylamine, and the popular mixtures of such amines in the $C_{11}$–$C_{14}$ and $C_{18}$–$C_{22}$ ranges. Amines having even considerably higher carbon values may also be employed successfully. All of these primary aliphatic amines have highly branched alkyl chains in which the primary amino nitrogen is attached to a tertiary carbon atom.

The prior art has known the reaction of a methylpyridine with sulfur to obtain a substituted thiophene or a disulfide. Methylpyridines have also been reacted with sulfur and an aromatic amine (such as phenylamine to obtain N-phenylthiopicolinamide) or a secondary amine (such as morpholine to obtain thiopicolinoyl morpholine), but in each case the yields were either less than a third of that obtained by the present invention or took more than twice the time to complete the reaction. The only other somewhat comparable compounds known to exist in the prior art are the picolinic and isonicotinic acid thioamides prepared by treating nitriles with hydrogen sulfide and ammonia. But these thioamides have no alkyl groups substituted on the amide nitrogen atom, and so quite understandably have entirely different properties from the compounds of the present invention. Similarly, the prior art has known of N-isopropyl thioisonicotinamide, N-methyl thioisonicotinamide, and N,N-dimethyl thioisonicotinamide. These compounds have been prepared by reacting ethylisonicotinate or isonicotinyl chloride hydrochloride with the corresponding amine to form the N-substituted isonicotinamide, then reacting with phosphorous pentasulfide the intermediate product thus formed. However, none of these thioisonicotinamides are substituted at the amide nitrogen atom with a tertiary carbon atom, but instead are substituted by either primary or secondary carbon atoms, or by two primary carbon atoms.

The use of t-carbinamines instead of the aromatic and secondary amines employed in the prior art has resulted in a number of important advantages for the present invention. To begin with, there are produced N-t-alkylthiopicolinamides and N-t-alkylthioisonicotinamides rather than N-arylthiopicolinamides and N-arylthioisonicotinamides. In addition, the use of t-carbinamines makes it possible to readily introduce long alkyl substituents on the amide nitrogen, a factor which has been demonstrated to improve the oil-solubility of the products. The products are not contaminated by other condensation products, such as benzothiozoles, which form when aromatic amines are used. It has already been stated that significantly greater yields are obtained and in much less time than in the most closely analogous prior art processes.

The reaction is carried out by refluxing the methylpyridine, sulfur, and t-carbinamine for from about four to about thirty hours. Heat is applied during the reaction for a period of time which depends upon the reaction temperature. This, in turn, is dependent upon the molecular weight and boiling point of the t-carbinamine and the molecular weight and activity of the particular methylpyridine that is used. In general, the higher the boiling point of the reaction mixture, the less time is required to carry out the reaction.

The mole ratio of the reactants can suitably range from 1:1:3 to 4:1:6, respectively for methylpyridine: t-carbinamine:sulfur. The preferred ratio is 2:1:6.

The reaction proceeds best when no catalysts or solvents (other than excess methylpyridine) are used. Isolation of the products is accomplished by filtering off the excess sulfur and then distilling. In some cases a small amount of dissolved sulfur distills with the product. This may be removed by treatment with sodium sulfide. In cases where the molecular weight of the product is relatively high, the mixture is merely stripped free of unreacted methylpyridine and t-carbinamine after removal of the sulfur.

The particular class of compounds obtained is determined by the methylpyridine which is used. Thus, with 4-methylpyridine the products are N-t-alkylthioisonicotinamides. With 2-methylpyridine, the products are N-t-alkylthiopicolinamides. When there are used 2-methylpyridines substituted by methyl groups in the 3-, 4-, or 6-positions, or by an ethyl group in the 5-position, the products are exclusively N-t-alkylthiopicolinamides; the other methyl groups are non-reactive. When there is a methyl group in the 2-position, it will react; if there is another methyl group in the same compound, such as in 2,3-lutidine, 2,4-lutidine, or 2,6-lutidine, that other methyl group will not react. However, if there is no methyl group in the 2-position, a methyl group in the 4-position will be reactive, an example being the case of gamma-picoline.

The invention is illustrated but in no way limited by the following two sets of examples. The first set, Examples 1–7, illustrates the novel process and some of the products made thereby in accordance with the present invention. The second set, Examples 8–16, shows a number of ways in which the novel compounds may be employed and the results of such utilization.

Example 1

A mixture of 107 parts of 2,6-lutidine, 65 parts of t-octylamine, and 96 parts of sulfur was stirred and refluxed for 8½ hours. The final temperature was 164° C. The mixture was cooled and heptane was added. The mixture was filtered to remove 56 parts of sulfur. The heptane and unreacted lutidine and t-octylamine were removed by distillation under reduced pressure. The crude reaction product (145 parts) was stirred for 1½ hours at 80° C. with a mixture of 89 parts of sodium sulfide nonahydrate, 667 parts of water, and 176 parts of methyl alcohol. It was then extracted with heptane, dried over anhydrous potassium carbonate, and distilled to give 119 parts of 6-methyl-N-t-octylthiopicolinamide which distilled at 136–151° C. at 0.65 mm. Hg. The product contained by analysis 68.24 percent of carbon, 9.23 percent of hydrogen, 10.32 percent of nitrogen and 11.84 percent of sulfur. Corresponding theoretical values are 68.13 percent, 9.15 percent, 10.60 percent, and 12.12 percent respectively.

Example 2

A mixture of 117 parts of 2-methyl-5-ethylpyridine, 96 parts of sulfur, and 65 parts of t-octylamine was stirred and refluxed for 8 hours. The final pot temperature was 200° C. The mixture was cooled, diluted with heptane, filtered free of excess sulfur, and distilled at 5 mm. Hg to remove the unreacted 2-methyl-5-ethylpyridine and t-octylamine. The residue from the distillation was stirred at 80° C. for 1½ hours with a mixture of 80 parts of sodium sulfide nonahydrate, 158 parts of methanol, and 600 parts of water in order to remove any dissolved sulfur. The mixture was cooled, extracted with heptane, and the extract dried over anhydrous potassium carbonate and distilled to give 125 parts of 5-ethyl-N-t-octylthiopicolinamide which distilled at 163°–173° C. at about 1 mm. Hg. The product obtained contained by analysis 69.06 percent of carbon, 9.27 percent of hydrogen, 10.02 percent of nitrogen, and 11.61 percent of sulfur. Corresponding theoretical values are 69.02 percent, 9.41 percent, 10.06 percent, and 11.51 percent respectively.

Example 3

A mixture of 107 parts of 2,4-lutidine, 96 parts of sulfur, and 65 parts of t-octylamine was stirred and refluxed for 4 hours while the temperature rose to 190° C. The mixture was cooled, diluted with heptane, filtered free of 43 parts of unreacted sulfur, and stripped at 95° C. and 5 mm. Hg. The residue was stirred for 1½ hours at 80° C. with a mixture of 80 parts of sodium sulfide nonahydrate, 500 parts of water, and 139 parts of methyl alcohol. The mixture was cooled and extracted with heptane. The heptane extract was dried over anhydrous potassium carbonate and distilled to give 108 parts of 4-methyl-N-t-octylthiopicolinamide which distilled at 150°–160° C. at 1 mm. Hg. The product contained by analysis 68.33 percent of carbon, 9.21 percent of hydrogen, 10.42 percent of nitrogen, and 12.11 percent of sulfur. Corresponding theoretical values are 68.13 percent, 9.15 percent, 10.60 percent, and 12.12 percent respectively.

Example 4

A mixture of 93 parts of alpha-picoline, 96 parts of sulfur, and 65 parts of t-octylamine was stirred and refluxed for 22 hours, cooled, filtered and distilled to give 117 parts of N-t-octylthiopicolinamide which boiled at 125°–140° C. at 0.6 mm. Hg and was contaminated by a few percent of dissolved sulfur.

A mixture of 163 parts of N-t-octylthiopicolinic amide prepared in this manner, 33 parts of sodium sulfide, 198 parts of methyl alcohol, and 750 parts of water was stirred at 80° C. for 1½ hours and extracted with heptane. The heptane extract was dried over anhydrous potassium carbonate and distilled to give 147 parts of N-t-octylthiopicolinamide which distilled at 126°–138° C. at 0.5 mm. Hg. It contained by analysis 66.86 percent of carbon, 8.76 percent of hydrogen, 11.16 percent of nitrogen, and 12.82 percent of sulfur. Corresponding theoretical values are 67.15 percent, 8.86 percent, 11.19 percent, and 12.80 percent respectively.

Example 5

A mixture of 54 parts of 2,3-lutidine, 48 parts of sulfur, and 47 parts of a $C_{11-14}H_{23-29}$ tertiary alkylamine was stirred and refluxed for 12 hours while hydrogen sulfide was evolved and the temperature rose to 187° C. The mixture was cooled, diluted with heptane, filtered, and stripped free of heptane. The residue was stirred at 80° C. for 1½ hours with a mixture of 50 parts of sodium sulfide nonahydrate, 500 parts of water, and 158 parts of methyl alcohol. The mixture was cooled and extracted with heptane. The heptane extract was dried over anhydrous potassium carbonate and distilled to give 54 parts of 3-methyl-N-t-alkylthiopicolinamide which boiled at 164°–185° C. at 0.5 to 0.7 mm. Hg. It contained by analysis 71.33 percent of carbon, 9.95 percent of hydrogen, 8.62 percent of nitrogen, and 9.79 percent of sulfur. Corresponding theoretical values are 70.53–72.35 percent, 9.87–10.41 percent, 8.04–9.14 percent, and 9.20–10.46 percent respectively.

Example 6

A mixture of 96 parts of sulfur, 93 parts of gamma-picoline, and 65 parts of t-octylamine was stirred and refluxed for 12 hours while the temperature rose to 158° C. The mixture was cooled, filtered, and distilled to give 75 parts of material which boiled at 140°–180° C. at 1 mm. Hg and solidified in the receiver. This was stirred at 80° C. for 1½ hours with a mixture of 60 parts of sodium sulfide nonahydrate, 119 parts of methyl alcohol, and 450 parts of water. The mixture was cooled and filtered free of a solid material. The solid material was recrystallized from heptane that was first used to extract the filtrate to 34 parts of yellow felted N-t-octylthioisonicotinamide. A small sample was recrystallized again from heptane and then melted at 117.5°–118.5° C. It contained by analysis 67.19 percent of carbon, 8.90 percent of hydrogen, 11.13 percent of nitrogen, and 13.00 percent of sulfur. Corresponding theoretical values are 67.15 percent, 8.86 percent, 11.19 percent, and 12.80 percent respectively.

Example 7

Following the procedure set forth in Examples 1–6 above the following N-t-alkylthiopicolinic amides were obtained:

|  | Boiling range |
|---|---|
| N-t-butyl | 112°–113° C./1.0 mm. Hg. |
| N-t-$C_{11-14}H_{23-29}$ | 155°–161° C./0.5 mm. Hg. |
| N-t-$C_{18-22}H_{37-45}$ | 170°–220° C./0.5 mm. Hg. |
| 6-methyl-N-t-butyl | 106°–107° C./0.35 mm. Hg. |
| 6-methyl-N-t-$C_{11-14}H_{23-29}$ | 160°–172° C./0.6 mm. Hg. |
| 6-methyl-N-t-$C_{18-22}H_{37-45}$ | 180°–220° C./0.9 mm. Hg. |
| 5-ethyl-N-t-butyl | 120°–123° C./0.35 mm. Hg. |
| 5-ethyl-N-t-$C_{11-14}H_{23-29}$ | 175°–190° C./0.55 mm. Hg. |
| 5-ethyl-N-t-$C_{18-22}H_{37-45}$ | Did not distill. |
| 4-methyl-N-t-butyl | 113° C./0.35 mm. Hg.— 130° C./0.55 mm. Hg. |
| 4-methyl-N-t-$C_{11-14}H_{23-29}$ | 173°–183° C./0.75 mm. Hg. |
| 4-methyl-N-t-$C_{18-22}H_{37-45}$ | Did not distill. |

In each case where the amide has a t-alkyl group of $C_{11-14}H_{23-29}$ it will be understood that the t-alkylamine used was a mixture of amines within the indicated range. Similarly, where a $C_{18-22}H_{37-45}$ group is shown a corresponding t-alkylamine had been employed. The analyses for all the listed products were close to the theoretical values.

Example 8

Some of the compounds made as described in Examples 1–7 were submitted to corrosion-oxidation stability tests (the 72-hour type of test described in the United States Government Standard Specification MIL–7808). The corrosive test material used was bis-2-ethylhexyl sebacate in an aircraft gas turbine lubricant. Comparisons of the protection against corrosion of steel, magnesium, aluminum, and silver by the compounds of the present invention were made with phenothiazine, a well-known inhibitor for this fluid, and the results proved to be quite favorable as shown in the following table.

the metal salt and N-t-alkylthiopicolinamide, evaporating off the alcohol, and purifying the product if necessary. Usually two moles of the N-t-alkylthiopicolinamide and one mole of the metal salt are involved in this type of reaction which may be illustrated by the following:

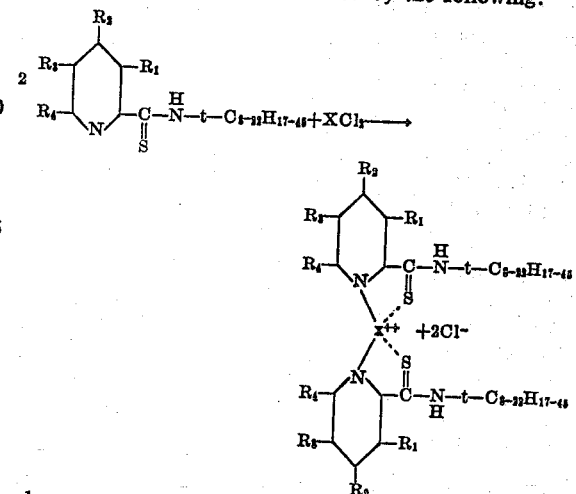

where:

$R_2$ and $R_3$ are methyl or ethyl,
$R_1$ and $R_4$ are hydrogen, and
X is nickel or copper.

An exception is the product formed from cupric chloride and N-t-octylthiopicolinamide which apparently formed a 1:1 complex. The product from nickel chloride and N-t-octylthiopicolinamide had an analysis indicating that it is a mixture of the 1:1 and 2:1 complexes, or the 2:1 complex with two moles of water of hydration.

Example 9

A solution of 12 parts of nickel chloride hexahydrate in about 79 parts of ethyl alcohol was poured into a solution of 32.7 parts of 4-methyl-N-t-$C_{11-14}H_{23-29}$ thiopicolinamide in about 79 parts of ethyl alcohol. The alcohol was evaporated off on a steam bath. The residue was dissolved in toluene and filtered free of a very small amount of insoluble material. The toluene was removed by distillation at reduced pressure. The product was a black solid of about 44 parts of the 2:1 coordination complex of the thioamide and nickel chloride. It melted at 122°–132° C. and contained by analysis 7.20 percent of nitrogen. The theoretical value is 6.8 to 7.6 percent.

| Inhibitor Sample No. | Wt. Percent | Corrosion, Wt. Change (mg./cm.²) | | | | Oxidation Resistance | | |
|---|---|---|---|---|---|---|---|---|
| | | Steel | Mg | Al | Ag | Percent Chge, cs., 100° F. | NN Change | Percent n-Pentane Insol. |
| None | | 0.0 | 0.0 | 0.0 | 0.0 | 154 | 35.3 | 4.4 |
| 1 | 0.5 | +0.2 | +0.1 | 0.0 | 0.0 | 1.86 | 1.15 | 0.23 |
| 2 | 1.0 | +0.4 | +0.3 | 0.0 | 0.0 | 1.91 | 1.45 | |
| 3 | 0.5 | +0.2 | +0.1 | +0.3 | +0.3 | 36.4 | 18.3 | 1.2 |
| 4 | 1.0 | −0.2 | −0.1 | 0.0 | −0.5 | 21.7 | 11.8 | 1.77 |
| 5 | 0.5 | +1.9 | +0.1 | 0.0 | +0.3 | 28.1 | 17.0 | 1.57 |
| 6 | 1.0 | +0.1 | 0.0 | +0.1 | 0.0 | 36.9 | 17.6 | 1.79 |
| 7 | 0.5 | 0.0 | −0.4 | 0.0 | +0.2 | 32.1 | 18.2 | 1.35 |
| 8 | 1.0 | 0.0 | +0.1 | 0.0 | +0.1 | 15.8 | 10.8 | 0.70 |
| 9 | 0.5 | −0.1 | −1.3 | 0.0 | +0.4 | 30.5 | 16.4 | 1.32 |
| 10 | 1.0 | +0.1 | 0.0 | 0.0 | +0.2 | 24.4 | 13.2 | 1.28 |
| 11 | 0.5 | 0.0 | −0.4 | −0.9 | +0.1 | 52.0 | 19.1 | 1.51 |
| 12 | 1.0 | +0.1 | −0.3 | −0.1 | +0.1 | 48.4 | 14.5 | 1.07 |
| 13 | 0.5 | 0.0 | −2.7 | 0.0 | −0.1 | 57.4 | 23.6 | 2.73 |
| 14 | 1.0 | +0.2 | 0.0 | −0.1 | +0.1 | 20.0 | 12.2 | 0.86 |
| 15 | 1.0 | 0.0 | +0.2 | −0.2 | +0.1 | 17.1 | 11.8 | 0.03 |
| 16 | 1.0 | 0.0 | −0.1 | −0.1 | 0.0 | −0.31 | 0.67 | 0.01 |
| MIL-L-7808C Requirements | | −0.2+0.2 | −0.2+0.2 | −0.2+0.2 | −0.2+0.2 | −5+15 | 2.0 max. | |

In the above numbered samples, Nos. 1 and 2 were phenothiazine and the rest were N-t-alkylthiopicolinamides in which the t-alkyl portions were, respectively, as follows: Nos. 3–6 were t-$C_8H_{17}$; 7–14 were $C_{11-14}H_{23-29}$; and 15–16 were $C_{18-22}H_{37-45}$.

Examples 9–15, which follow, disclose coordination complexes of metal salts such as cupric chloride and nickel chloride with t-alkylthiopicolinamides. These complexes, which are useful as fungicides and pesticides, were prepared simply by mixing alcoholic solutions of

Example 10

A solution of 32.7 parts of 4-methyl-N-t-$C_{11-14}H_{23-29}$ thiopicolinamide in about 79 parts of ethyl alcohol was poured into a solution of 8.5 parts of cupric chloride dihydrate in about 79 parts of ethyl alcohol. The alcohol was evaporated off on a steam bath after the mixture was well stirred. The oily residue of about 50 parts was dissolved in toluene. There was no insoluble material. The toluene was distilled off at reduced pressure. The product was a dark, glassy tar which contained by analysis 7.02 percent of nitrogen. The theoretical value for a 1:2 complex of copper chloride and 4-methyl-N-t-$C_{11-14}H_{23-29}$ thiopicolinamide is 6.7–7.5 percent.

Example 11

A solution of 6.0 parts of nickel chloride hexahydrate in about 59 parts of ethyl alcohol was added to a solution of 22.3 parts of 5-ethyl-N-t-$C_{18-22}H_{37-45}$ thiopicolinamide in about 59 parts of ethyl alcohol. The alcohol was evaporated off to a residue of about 50 parts. This was completely soluble in toluene. The toluene was distilled off at reduced pressure to a residue of 26.5 parts of a dark, glassy solid. This contained by analysis 5.65 percent of nitrogen. The theoretical value is 5.2–5.8 percent for the 1:2 complex of nickel chloride and 5-ethyl-N-t-$C_{18-22}H_{37-45}$ thiopicolinamide.

Example 12

A solution of 4.3 parts of cupric chloride dihydrate in about 40 parts of ethyl alcohol was added to a solution of 22.3 parts of 5-ethyl-N-t-$C_{18-22}H_{37-45}$ thiopicolinamide in about 59 parts of ethyl alcohol. The alcohol was evaporated off on a steam bath to a residue of about 50 parts. This was entirely dissolved in toluene. The toluene was distilled off at reduced pressure. The viscous, tarry product of 27 parts contained 5.49 percent of nitrogen. The theoretical value is 5.1–5.8 percent for the 1:2 complex of cupric chloride and 5-ethyl-N-t-$C_{18-22}H_{37-45}$ thiopicolinamide.

Example 13

A solution of 25 parts of N-t-octylthiopicolinamide in about 40 parts of ethyl alcohol was poured into a solution of 8.5 parts of cupric chloride dihydrate in about 79 parts of ethyl alcohol. A small amount of alcohol was evaporated off and the mixture was diluted with about 410 parts of heptane. There was filtered off about 20 parts of a solid. The heptane was removed from the filtrate by distillation under reduced pressure. The residue from the distillation consisting of a mixture of solid and liquid. This was diluted with a small amount of heptane and the mixture filtered to remove the solid. The two solid portions were combined, washed with toluene, and dried to a green solid of 18 parts which decomposed at 170°–173° C. It contained by analysis 7.27 percent of nitrogen. The theoretical value is 7.28 percent for the 1:1 complex of cupric chloride and N-t-octylthiopicolinamide. The combined heptane and toluene portions were stripped to a dark liquid residue of 12.5 parts of unreacted N-t-octylthiopicolinamide.

Example 14

A solution of 12 parts of nickel chloride hexahydrate in about 79 parts of ethyl alcohol was poured into a solution of 25 parts of N-t-octylthiopicolinamide in about 40 parts of ethyl alcohol. The alcohol was evaporated off to a mushy, solid residue. This was diluted with about 200 parts of hexane and the mixture filtered to remove a tan solid. The solid was washed with warm toluene and dried to 28 parts of tan solid product which decomposed when a melting point determination was made. The combined hexane and toluene portions were stripped to a yellow liquid residue of 5 parts of unreacted N-t-octylthiopicolinamide. The solid product contained by analysis 8.37 percent of nitrogen. Theoretical values are 7.39 percent and 8.90 percent respectively for the 1:1 and 1:2 complexes of nickel chloride and N-t-octylthiopicolinamide.

Example 15

A solution of 32.7 parts of 6-methyl-N-t-$C_{11-14}H_{23-29}$ thiopicolinamide in about 79 parts of ethyl alcohol was mixed with an alcoholic solution of 12 parts of nickel chloride hexahydrate. The alcohol was evaporated off on a steam bath to a residue which was a mixture of a liquid and a solid. The mixture was diluted with heptane and filtered. The solid residue of about 10 parts was water soluble. The heptane solution was stripped to a clear liquid residue of about 32.5 parts of unreacted 6-methyl-N-t-$C_{11-14}H_{23-29}$ thiopicolinamide, showing that no reaction occurred (no complex formed).

Example 16

The fungicidal activity of the compounds of the present invention was successfully demonstrated by means of standard tests in which strains of Macrosporium and of Sclerotinia were diluted with distilled water to a concentration of 0.001 percent, 0.005 percent, 0.01 percent, and 0.1 percent. The compounds tested were:

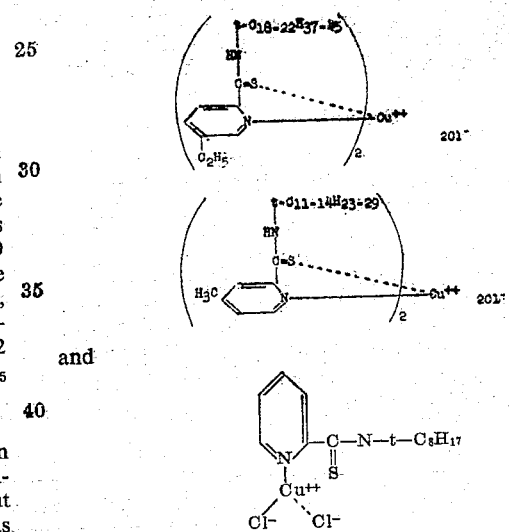

and

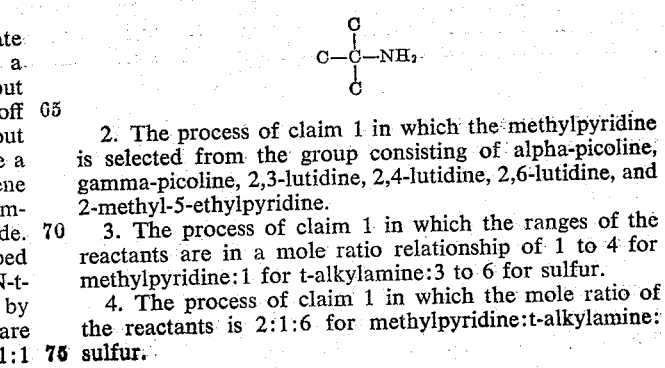

In each case, there was 100 percent inhibition of germination with the samples containing 0.005 percent, 0.01 percent, and 0.1 percent, and appreciable inhibition even with the samples containing 0.001 percent. The compounds were further demonstrated to be nonphytotoxic when tested with tomatoes at a concentration of 1.0 percent which is well above the concentrations shown above to be 100 percent effective as a fungicide.

We claim:

1. A process for the production of N-t-alkylthiopicolinamides and N-t-alkylthioisonicotinamides which comprises reacting a methylpyridine with sulfur and a t-alkylamine, the t-alkylamine having between four and twenty-two carbon atoms and further having the following structural relationship with the —NH— group:

$$\begin{array}{c} C \\ | \\ C-C-NH_2 \\ | \\ C \end{array}$$

2. The process of claim 1 in which the methylpyridine is selected from the group consisting of alpha-picoline, gamma-picoline, 2,3-lutidine, 2,4-lutidine, 2,6-lutidine, and 2-methyl-5-ethylpyridine.

3. The process of claim 1 in which the ranges of the reactants are in a mole ratio relationship of 1 to 4 for methylpyridine:1 for t-alkylamine:3 to 6 for sulfur.

4. The process of claim 1 in which the mole ratio of the reactants is 2:1:6 for methylpyridine:t-alkylamine:sulfur.

5. The process of claim 1 in which the t-alkylamine is a mixture of primary aliphatic amines having highly branched alkyl chains, the number of carbon atoms in the amines in the mixture ranging from eleven to twenty-two.

6. N-t-alkylthiopicolinamides having the structure:

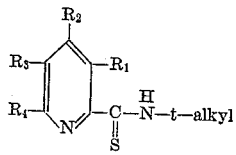

wherein $R_1$, $R_2$ and $R_4$ are chosen from the class consisting of hydrogen and a methyl group, $R_3$ is chosen from the class consisting of hydrogen and an ethyl group, and the -t-alkyl group embodies the following structural relationship with the —NH— group:

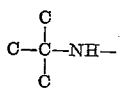

the number of carbon atoms in the t-alkyl group ranging from 4 to 22.

7. N-t-alkylthioisonicotinamides having the structure:

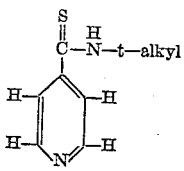

wherein the -t-alkyl group embodies the following structural relationship with the —NH— group:

the number of carbon atoms in the t-alkyl group ranging from 4 to 22.

8. 4-methyl-N-t-octylthiopicolinamide.
9. N-t-octylthiopicolinamide.
10. N-t-octylthioisonicotinamide.
11. 5-ethyl-N-t-$C_{18-22}H_{37-45}$thiopicolinamide.
12. 4-methyl-N-t-$C_{11-14}H_{23-29}$thiopicolinamide.

References Cited in the file of this patent

UNITED STATES PATENTS

| | | |
|---|---|---|
| 2,265,212 | Westphal | Dec. 9, 1941 |
| 2,560,046 | Alliger | July 10, 1951 |
| 2,560,296 | Levesque | July 10, 1951 |

OTHER REFERENCES

Emmert et al.: Chemische Berichte, vol. 86 (1953), pp. 208–213.